United States Patent [19]
Kostka

[11] Patent Number: 6,076,926
[45] Date of Patent: Jun. 20, 2000

[54] FACE CONFORMING EYEWEAR

[76] Inventor: Mark Kostka, 10768 Knott Ave., Stanton, Calif. 90680

[21] Appl. No.: 09/144,210

[22] Filed: Aug. 31, 1998

Related U.S. Application Data

[63] Continuation of application No. 08/694,613, Aug. 13, 1996, abandoned.

[51] Int. Cl.[7] .................................................. G02C 5/16
[52] U.S. Cl. ......................... 351/113; 351/124; 351/126; 351/153
[58] Field of Search ................................ 351/41, 63, 153, 351/44, 114, 111, 126, 124, 113; 2/454; 16/228

[56] References Cited

U.S. PATENT DOCUMENTS

| | | |
|---|---|---|
| 4,005,930 | 2/1977 | Guenin . |
| 4,549,792 | 10/1985 | Dianitsch . |
| 4,750,828 | 6/1988 | Sartor . |
| 4,887,895 | 12/1989 | Tzeng . |
| 5,225,857 | 7/1993 | Sakamoto . |
| 5,359,370 | 10/1994 | Mugnier . |
| 5,406,339 | 4/1995 | Chen . |
| 5,483,302 | 1/1996 | Jaffelin . |
| 5,805,261 | 9/1998 | Houston et al. ......................... 351/126 |
| 5,818,567 | 10/1998 | Sakai ..................................... 351/113 |

*Primary Examiner*—Hung Xuan Dang
*Attorney, Agent, or Firm*—James G. O'Neill

[57] ABSTRACT

Face conforming eyewear includes a rotation limiting hinged bridge and flexible temples with open barrel hinges to reduce the inflexibility of the eyewear frame. The preferred temples have a greater than 90° movement, up to about 105°, with respect to the frame. The extra degrees of movement of the temples and the limited rotational movement of the hinged bridge, from about 4° to about 12°, allows opposed sides of the frame and the temples to shift and to absorb pressure when contact has been made with the eyewear, especially when worn in active sports. The bridge can incorporate a single or double three barrel hinged.

16 Claims, 2 Drawing Sheets

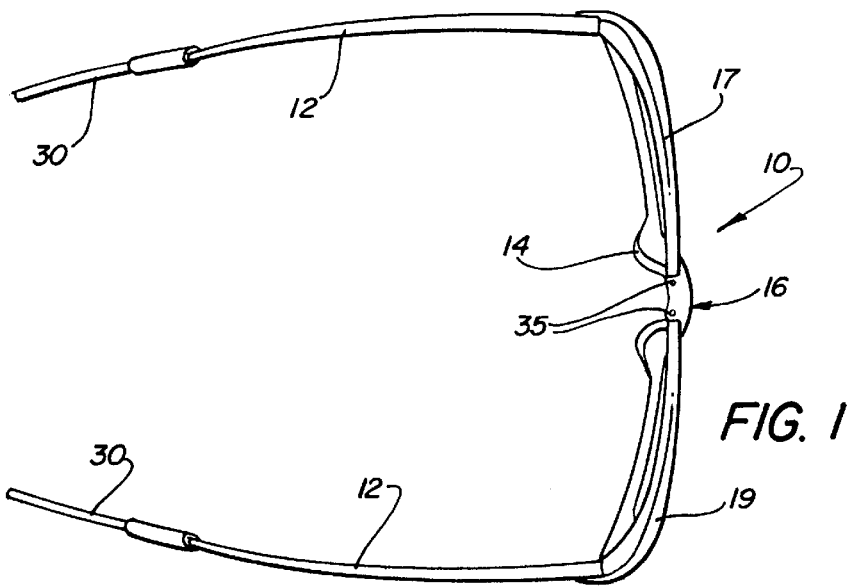
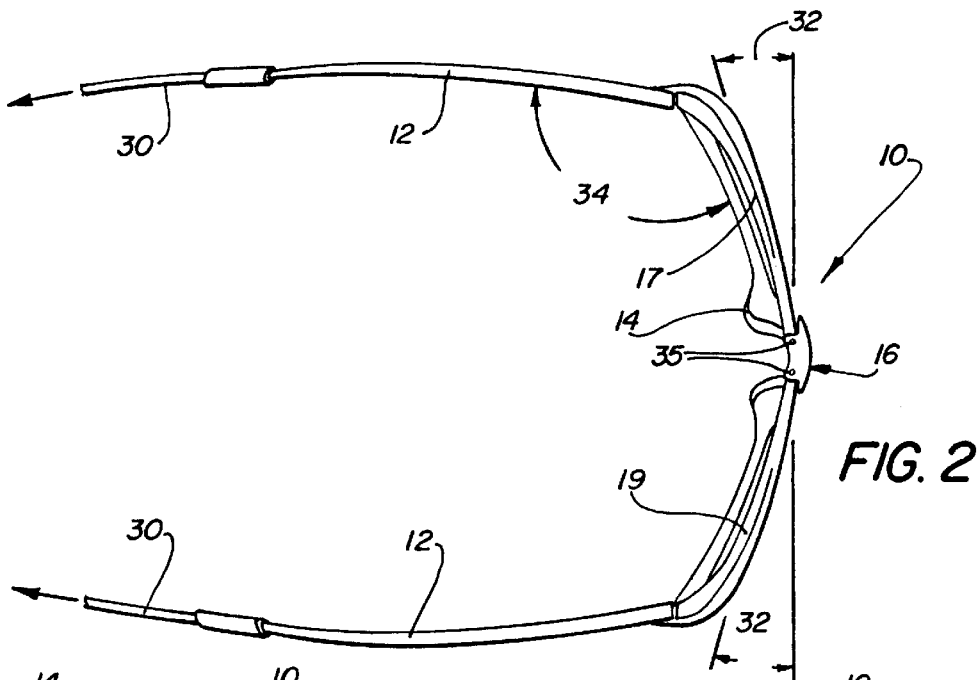

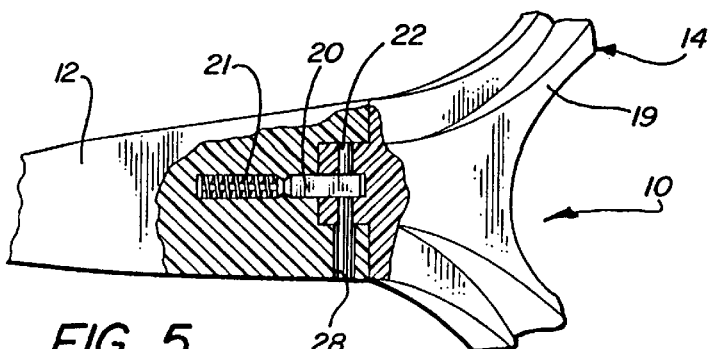
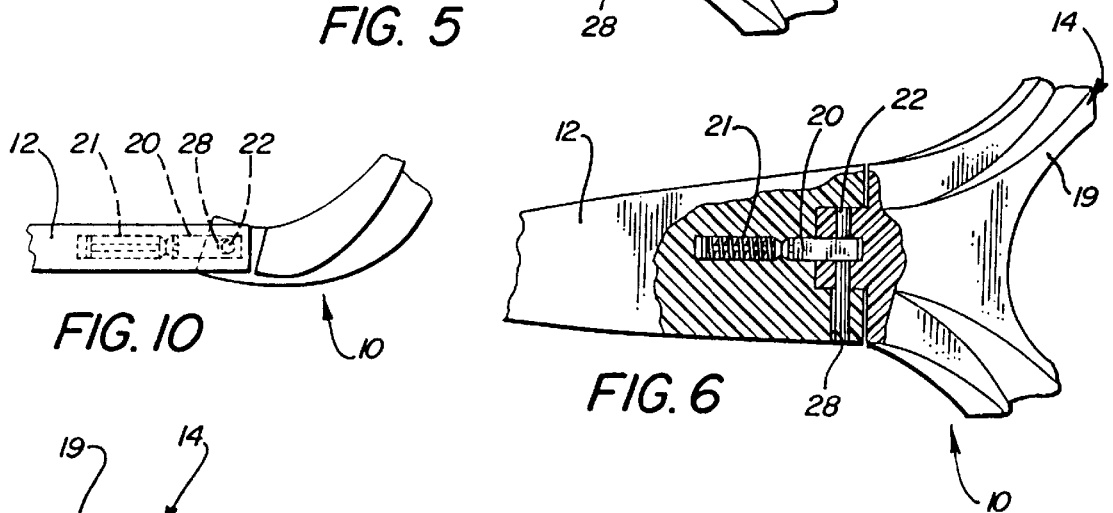
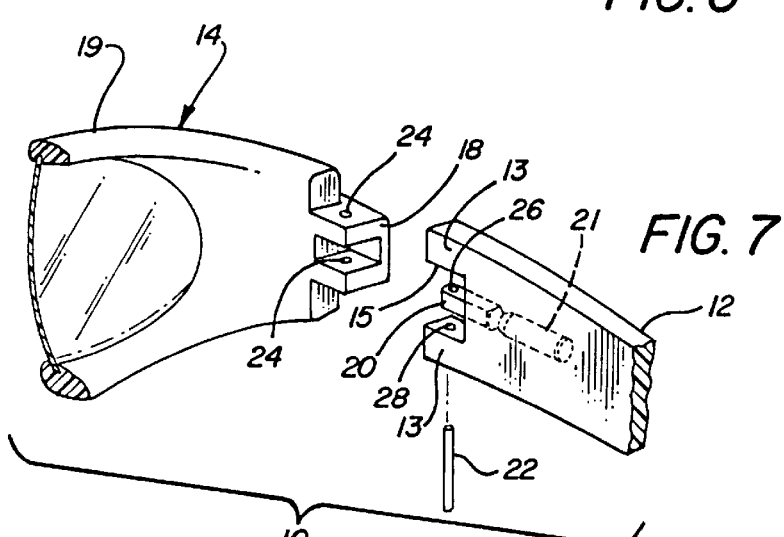
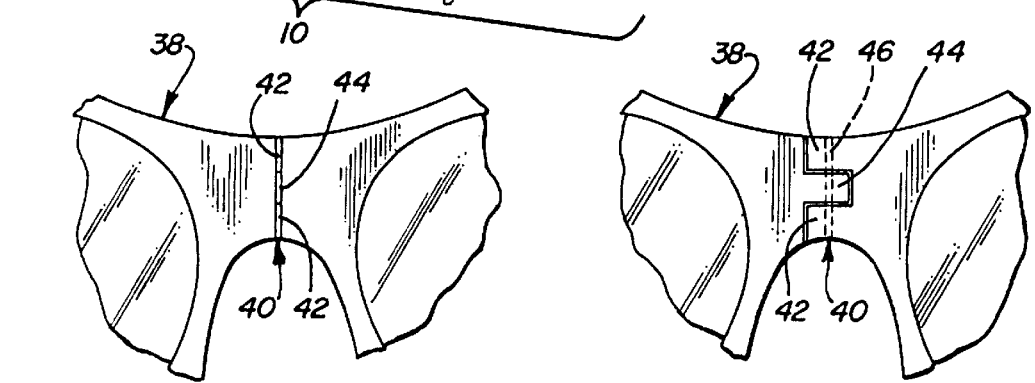

FACE CONFORMING EYEWEAR

CROSS REFERENCE TO RELATED APPLICATIONS

This is a Continuation of application Ser. No. 08/694,613, filed on Aug. 13, 1996 now abandoned, entitled EYEWEAR FOR SPORTS ACTIVITIES.

BACKGROUND OF THE INVENTION

1. Field of the Invention

This invention relates generally to eyewear, and, more particularly, to face conforming eyewear having flexible temples and a limited motion hinged bridge.

2. Description of Related Art

Prior art eyewear, especially sunglasses, utilize an inflexible frame having two rigid temples (or earpieces) wherein the hinge between the frame and each temple has a maximum movement of about 90 degrees. The front frame which is connected to each temple, by the hinges, is usually rigid and has a rigid bridge (or nose piece), which fits over the nose when worn.

However, known eyewear does not contain means which allow such eyewear to flex so as to comfortably conform to the face of the user.

Therefore, there exists a need in the art for eyewear which has both a conformable frame and temple pieces so that such eyewear will form fit a person's face, especially during activities.

SUMMARY OF THE INVENTION

The eyewear of the present invention benefits those who are involved in sports and activities where acceleration, speed and potential contact with a surface or object is a concern. It is especially useful for water activities, such as water skiing, wind surfing and board surfing, where protection from harmful ultraviolet rays is needed. Preferably, a head strap is attached to the outer ends of the temples to secure the eyewear on a person's head during these activities. The present invention includes improved temples, and an improved hinged bridge allowing limited rotational motion. The limited motion, hinged bridge provides for a flexible frame reducing breakage, and the connection of the temples to the flexible frame allows up to approximately 105° of movement at the temple connections, to provide a more comfortable, secure, face conforming fit.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, in which:

FIG. 1 is a top plan view showing one embodiment of the eyewear of the present invention, with the temples in an opened position, at approximately 90° to a front frame;

FIG. 2 is a further top plan view of the eyewear of FIG. 1, with the temples moved to a position beyond 90° to the frame, and showing limited rotational movement of the sides of the frame around a nose bridge;

FIG. 3 is an enlarged, partial front elevational view of one embodiment of the limited rotation hinged bridge of the present invention;

FIG. 4 is a rear elevational view of FIG. 3;

FIG. 5 is an enlarged elevational view, partially in cross section, of one embodiment of a connecting mechanism between a temple piece and the front frame of the eyewear shown in FIG. 1 with the temple piece at approximately 90°;

FIG. 6 is an enlarged view, partially in cross section, of the connecting mechanism between a temple piece and the front frame, with the temple piece moved to an open position, beyond 90°, as shown in FIG. 2;

FIG. 7 is a partial perspective, exploded view of the connection of one of the temple pieces to the front frame;

FIGS. 8 and 9 show the front and rear views of a further embodiment of a limited rotation, hinged bridge; and FIG. 10 is a top plan view of FIG. 6.

DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide for improved face conforming eyewear 10 that easily fits the face of a wearer, so as to be more comfortable and provide better protection during activities, such as sports.

The eyewear of the present invention includes a pair of movable temples 12, secured to a front frame 14, having left and right side portions 17, 19, carrying lenses therein. Features that permit for a more secure fit and added frame strength of the eyewear 10 of the present invention are a temple butt portion with hinge placement, including a flexible spring or tab and a shaft, and a central hinged bridge 16, having limited movement, between the left and right side portions 17, 19.

As is known, when a hinge is separated apart each piece is called a barrel. The temples 12, as shown in the drawings, and their two barrels 13 (see FIGS. 5–7) can be one complete and single piece. An opening or spacing 15 is formed between the barrels 13, and is adapted to fit over an interfitting barrel 18, and the spacing 15 is open and nonrestrictive. This allows each temple 12 to move more than 90 degrees, and up to about 105°, with respect to the front frame 14.

The interfitting barrel 18 of the hinge assembly is formed as one piece on the frame front 14. When the temples 12 and frame front 14 are assembled, this creates a unique hinge at each end or side edge of the front frame, which provides some movement, beyond 90°, of the temples to the frame front.

As best shown in FIGS. 5–7 and 10, tension can be created in the hinge assembly between the temples 12 and front frame 14 by a tab 20, which is held in the temples 12 by a flexible or resilient inner end or holding portion 21, for example, a spring biased member. The tab 20 extends into the opening 15 where it is held in the inner fitting barrel 18 of the frame front 14 and the lower barrel 13 by a pin 22 held in aligned openings 24, 26, 28. The pin 22 is inserted into opening 28 in lower barrel 13, and then into aligned openings 24, 26, and it is held therein, after assembling the temples to the front frame. When assembled, this creates tension in the temples which permits the eyewear 10 to be worn with or without a head strap.

As shown in FIG. 1, with the temples 12 in the open position at approximately 90° to the front frame 14, the central hinged bridge 16 will hold left and right sides 17, 19 of the front frame in normal or straight positions. A head strap 30 may be secured to the outer ends of the temples when playing sports or other activities.

When placed on the head of a wearer (not shown for clarity), the head strap 30 may be tightened around the head of the wearer to thereby rotate the left and right sides of the front frame 14, a limited amount, between about 4° to about 12°, as shown at 32 in FIG. 2, while at the same time, moving or rotating the temples 12 more than 90°, relative to the frame front 14, as shown at 34.

FIGS. 3 and 4 illustrate the front and rear of the central, limited rotation, hinged bridge 16, which allows only limited rotational motion of the left and right sides of the front frame, as described above. This limited rotation bridge 16 is preferably a double three barrel hinge having a pair of pins 35, held in barrels 36, 37 formed therein.

FIGS. 8 and 9 illustrate a further embodiment 38 of a front frame, having a single three barrel hinged bridge 40 with barrels 42, 44 connected together by a single pin 46.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than is specifically described herein.

What is claimed is:

1. Face conforming eyewear having two movable temples attached to opposing sides of a frame member having a central bridge connecting the opposing sides comprising, in combination:

hinge elements attaching the two movable temples to the frame member, said hinge elements permitting more than 90° movement of the two movable temples relative to the frame member; and a limited movement hinge formed in the central bridge, to only allow limited rotational movement of the opposing sides of the frame member.

2. The face conforming eyewear of claim 1 wherein the hinge elements include flexible elements therein, held between the two movable temples and the frame member.

3. The face conforming eyewear of claim 2 wherein the flexible elements are tabs.

4. The face conforming eyewear of claim 2 wherein the flexible elements are springs.

5. The face conforming eyewear of claim 1 wherein the limited movement hinge in the central bridge is a single three barrel hinge.

6. The face conforming eyewear of claim 5 wherein the limited rotational movement of the opposing sides allowed by the single three barrel hinge is between about 4° and about 12°.

7. The face conforming eyewear of claim 1 wherein the limited movement hinge in the central bridge is a dual three barrel hinge.

8. The face conforming eyewear of claim 7 wherein the limited rotational movement of the opposing sides allowed by the dual three barrel hinge is between about 4° and about 12°.

9. The face conforming eyewear of claim 1 wherein the hinge elements permit rotational movement of about 105° for the two movable temples relative to the frame member.

10. Face conforming eyewear having two temples rotatably mounted on opposite sides of a frame member having two sides containing lenses connected by a central bridge, comprising, in combination:

open hinge elements attaching the two temples to the frame member;

resilient elements held in the open hinge elements to permit rotation of the two temples more than 90° with respect to the frame member; and a single three barrel hinge formed in the central bridge, said single three barrel hinge allowing only limited rotation of the frame member.

11. The face conforming eyewear of claim 10 wherein the single three barrel hinge formed in the central bridge allows only limited rotation of the two sides of the frame member of between about 4° and about 12°.

12. The face conforming eyewear of claim 11 wherein the resilient elements are flexible tabs held between the frame member and the two temples.

13. The face conforming eyewear of claim 11 wherein the resilient elements are flexible springs held between the frame member and the two temples.

14. The eyewear of claim 10 wherein the resilient elements permit rotational movement of the two temples of about 105° with respect to the frame member.

15. Face conforming eyewear having two temples rotatably mounted on opposite sides of a frame member having two sides containing lenses connected by a central bridge, comprising, in combination:

open hinge elements attaching the two temples to the frame member;

resilient elements held in the open hinge elements between the frame member and the two temples to permit rotation of the two temples of about 105° with respect to the frame member; and a pair of three barrel hinges formed in the central bridge; said pair of three barrel hinges allowing only limited rotation of the two sides of the frame member.

16. The face conforming eyewear of claim 15 wherein the pair of three barrel hinges formed in the central bridge allows only limited rotation of the two sides of the frame member of between about 4° and about 12°.

* * * * *